United States Patent
Yu et al.

(10) Patent No.: US 10,048,528 B2
(45) Date of Patent: Aug. 14, 2018

(54) LIQUID CRYSTAL DISPLAY

(71) Applicant: Samsung SDI Co., Ltd., Yongin-si (KR)

(72) Inventors: Arum Yu, Suwon-si (KR); Do-Uk Kim, Suwon-si (KR); Ji-Hye Kim, Suwon-si (KR); Ho-Jeong Paek, Suwon-si (KR); Haeni Song, Suwon-si (KR); Kyung-Won Ahn, Suwon-si (KR); Young-Tai Lee, Suwon-si (KR); Jun-Ho Lee, Suwon-si (KR); Hye-Min Lee, Suwon-si (KR); Seung-Jib Choi, Suwon-si (KR); Hyun-Moo Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 377 days.

(21) Appl. No.: 14/789,181

(22) Filed: Jul. 1, 2015

(65) Prior Publication Data

US 2016/0139455 A1      May 19, 2016

(30) Foreign Application Priority Data

Nov. 19, 2014   (KR) .................. 10-2014-0161934
Jun. 10, 2015   (KR) .................. 10-2015-0082151

(51) Int. Cl.
*G02F 1/1335*   (2006.01)
*G02F 1/1339*   (2006.01)
*G02F 1/1362*   (2006.01)

(52) U.S. Cl.
CPC .... *G02F 1/133512* (2013.01); *G02F 1/13394* (2013.01); *G02F 1/133514* (2013.01);
(Continued)

(58) Field of Classification Search
CPC ......... G02F 1/133512; G02F 1/133514; G02F 1/13394; G02F 1/136209; G02F 2001/136222; Y10T 428/1041
See application file for complete search history.

(56) References Cited

U.S. PATENT DOCUMENTS 6,503,937 B1   1/2003   Nesvadba et al.
6,855,465 B2   2/2005   Yi et al.
(Continued)

FOREIGN PATENT DOCUMENTS

JP    11337949 A   * 12/1999
JP    2002-258267 A    9/2002
(Continued)

OTHER PUBLICATIONS

Search Report in counterpart Taiwanese Application No. 104124266 dated Apr. 24, 2016, pp. 1.

*Primary Examiner* — Sophie Hon
(74) *Attorney, Agent, or Firm* — Additon, Higgins & Pendleton, P.A.

(57) ABSTRACT

A liquid crystal display (LCD) includes a thin film transistor positioned on a lower substrate; a plurality of color filters positioned on the thin film transistor and aligned to be spaced apart from each other; an insulation layer positioned on the plurality of color filters; a light-blocking layer positioned on the insulation layer; a transparent layer positioned on the light-blocking layer and having a convex shape; an upper substrate facing the lower substrate; and a liquid crystal layer interposed between the lower substrate and the upper substrate, wherein the light-blocking layer includes an organic black pigment, and the transparent layer having the convex shape has a different shape from the light-blocking layer.

19 Claims, 6 Drawing Sheets

(52) U.S. Cl.
CPC ............. *G02F 2001/136222* (2013.01); *Y10T 428/1041* (2015.01)

(56) References Cited

U.S. PATENT DOCUMENTS

| | | | |
|---|---|---|---|
| 6,958,792 B2 | 10/2005 | Lan et al. | |
| 6,989,056 B2 | 1/2006 | Babler | |
| 7,230,662 B2 | 6/2007 | Yi et al. | |
| 7,750,999 B2 | 7/2010 | Park | |
| 8,098,360 B2 | 1/2012 | Jeon et al. | |
| 8,212,976 B2 | 7/2012 | Park | |
| 8,379,171 B2 | 2/2013 | Lee et al. | |
| 8,691,002 B2 | 4/2014 | Eichenberger et al. | |
| 8,854,579 B2 | 10/2014 | Chang et al. | |
| 8,966,943 B2 | 3/2015 | Ryu et al. | |
| 2004/0100596 A1* | 5/2004 | Lan | G02F 1/136209 349/110 |
| 2004/0183989 A1* | 9/2004 | Kim | G02F 1/13394 349/155 |
| 2007/0273683 A1* | 11/2007 | Yamada | G02F 1/136213 345/212 |
| 2011/0294051 A1* | 12/2011 | Sultemeyer | C09B 7/08 430/7 |
| 2013/0077031 A1* | 3/2013 | Kim | G02F 1/13394 349/106 |
| 2013/0120683 A1 | 5/2013 | Lin et al. | |
| 2014/0218667 A1 | 8/2014 | Miyachi et al. | |

FOREIGN PATENT DOCUMENTS

| | | |
|---|---|---|
| JP | 2011-039392 A | 2/2011 |
| JP | 5195092 B2 | 5/2013 |
| JP | 2014-139668 A | 7/2014 |
| KR | 10-2005-0070344 A | 7/2005 |
| KR | 10-0736629 B1 | 7/2007 |
| KR | 10-0772940 B1 | 11/2007 |
| KR | 10-2010-0061124 A | 6/2010 |
| KR | 10-1022552 B1 | 3/2011 |
| KR | 10-2011-0047001 A | 5/2011 |
| KR | 10-2011-0056961 A | 5/2011 |
| KR | 10-2011-0108401 A | 10/2011 |
| KR | 10-2012-0032375 A | 4/2012 |
| KR | 10-2013-0032065 A | 4/2013 |
| KR | 10-2013-0053906 A | 5/2013 |
| KR | 10-1474803 B1 | 12/2014 |
| TW | 201312230 | 3/2013 |
| TW | 201319702 | 5/2013 |
| TW | 201326993 | 7/2013 |
| TW | 201333609 | 8/2013 |
| WO | 00/24736 A1 | 5/2000 |
| WO | 2005/030878 A1 | 4/2005 |
| WO | 2010/008162 A2 | 1/2010 |

* cited by examiner

LIQUID CRYSTAL DISPLAY

CROSS-REFERENCE TO RELATED APPLICATION

This application claims priority to and the benefit of Korean Patent Application No. 10-2014-0161934 filed in the Korean Intellectual Property Office on Nov. 19, 2014, and Korean Patent Application No. 10-2015-0082151 filed in the Korean Intellectual Property Office on Jun. 10, 2015, the entire disclosures of which are incorporated herein by reference.

FIELD OF THE INVENTION

This disclosure relates to a liquid crystal display (LCD).

BACKGROUND OF THE INVENTION

A liquid crystal display (LCD) is one of the most widely used flat panel displays. A LCD is a display device that can adjust the amount of transmitted light by applying a voltage to an electrode formed by interposing a liquid crystal layer between two display panels and realigning liquid crystal molecules of the liquid crystal layer.

An example of a currently-used liquid crystal display (LCD) has a structure where a field generating electrode is respectively mounted in the two display panels. Specifically, in the main structure, a plurality of thin film transistors and a pixel electrode are aligned in a matrix form in one display panel (hereinafter, referred to as 'a thin film transistor array panel'), while red, green and blue color filters are formed in the other display panel (hereinafter, referred to as 'a common electrode panel'), and a common electrode covers the foreside (front surface) thereof.

However, since the pixel electrodes and the color filters are formed in different display panels, it can be difficult to precisely align the same, and the resultant liquid crystal display (LCD) may have an alignment error. In order to solve this problem, a structure in which the color filters and the pixel electrode are formed on the same display panel (color filter on array, COA) has been proposed.

As another option, when a thin film transistor array panel is aligned with a common electrode panel, a light-blocking layer can be formed to be larger than a predetermined size, based on an align margin.

In addition, a liquid crystal layer space between the two display panels is referred to as a cell gap, and the cell gap has an influence on overall operation characteristics of the liquid crystal display (LCD) such as response speed, contrast ratio, viewing angle, luminance uniformity and the like. When the cell gap is not uniform, a uniform image is not displayed all over a screen, causing an image quality defect.

Accordingly, there is a need for a liquid crystal display (LCD) that can prevent deterioration of an aperture ratio due to the increased size of a light-blocking layer and can maintain a uniform cell gap all over the foreside of a substrate.

SUMMARY OF THE INVENTION

One embodiment provides a liquid crystal display (LCD) that can have excellent reliability by forming a light-blocking layer and a transparent layer simultaneously, wherein the light-blocking layer has a different shape from the transparent layer.

One embodiment provides a liquid crystal display (LCD) that includes a thin film transistor positioned on a lower substrate; a plurality of color filters positioned on the thin film transistor and aligned to be spaced apart from each other; an insulation layer positioned on the plurality of color filters; a light-blocking layer positioned on the insulation layer; a transparent layer positioned on the light-blocking layer and having a convex shape; an upper substrate facing the lower substrate; and a liquid crystal layer interposed between the lower substrate and the upper substrate, wherein the light-blocking layer includes an organic black pigment, and the transparent layer having the convex shape has a different shape from the light-blocking layer.

The organic black pigment may include a compound represented by the following Chemical Formula 1.

[Chemical Formula 1]

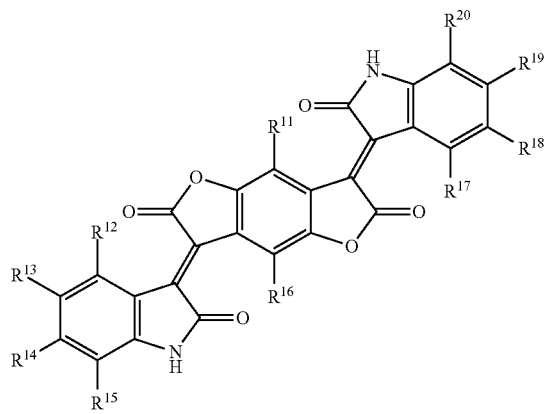

In Chemical Formula 1,
$R^{11}$ to $R^{20}$ are the same or different and are each independently hydrogen or substituted or unsubstituted C1 to C10 alkyl.

The transparent layer having the convex shape may cover a whole or a part of a front surface of the light-blocking layer.

The transparent layer may include a main transparent layer and an auxiliary transparent layer.

The main transparent layer may have a thicker thickness than that of the auxiliary transparent layer.

The main transparent layer may support the gap between the upper substrate and the lower substrate.

The liquid crystal display (LCD) may further include a pixel electrode between the insulation layer and the light-blocking layer.

The liquid crystal display (LCD) may further include a common electrode interposed between the upper substrate and the liquid crystal layer.

The liquid crystal display (LCD) may further include a common electrode directly on the lower substrate.

The light-blocking layer may have a larger optical density than that of the transparent layer by about 1.0 or greater.

The light-blocking layer and transparent layer may be manufactured by coating a light-blocking layer composition and drying the same, coating a transparent layer composition on the dried light-blocking layer composition and drying the same, and simultaneously exposing and developing the light-blocking layer composition and transparent layer composition.

The light-blocking layer composition may include a binder resin, a reactive unsaturated compound, a photopolymerization initiator, an organic black pigment, and a solvent.

The light-blocking layer composition may include about 1 wt % to about 30 wt % of the binder resin; about 1 wt % to about 20 wt % of the reactive unsaturated compound; about 0.05 wt % to about 5 wt % of the photopolymerization initiator; about 1 wt % to about 30 wt % of the organic black pigment, and a balance amount of the solvent.

The transparent layer composition may include a binder resin, a reactive unsaturated compound, a photopolymerization initiator, and a solvent.

The transparent layer composition may optionally further include a black pigment.

The transparent layer composition may include about 3 wt % to about 70 wt % of the binder resin; about 2 wt % to about 40 wt % of the reactive unsaturated compound; about 0.1 wt % to about 5 wt % of the photopolymerization initiator; and a balance amount of the solvent.

Other embodiments of the present invention are included in the following detailed description.

The light-blocking layer and the transparent layer, wherein the light-blocking layer has a convex shape and a different shape from the transparent layer, can be simultaneously formed to provide a liquid crystal display (LCD) that can have excellent reliability.

DETAILED DESCRIPTION

Figure 1:
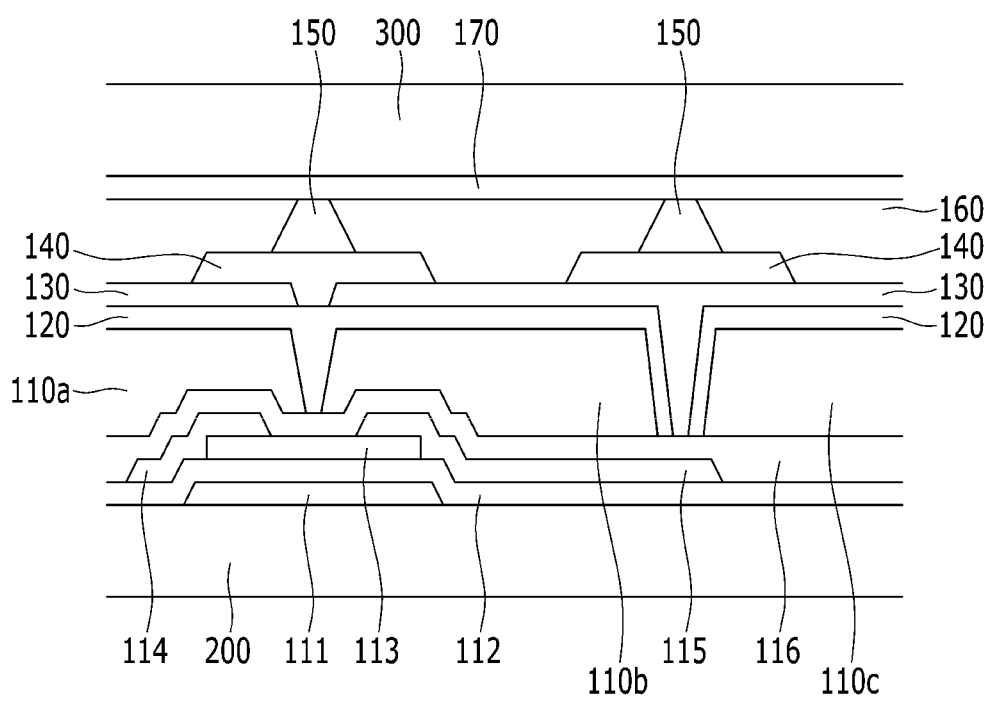
FIGS. 1 to 4 are cross-sectional views of liquid crystal displays (LCDs) according to exemplary embodiments.
Figure 2:
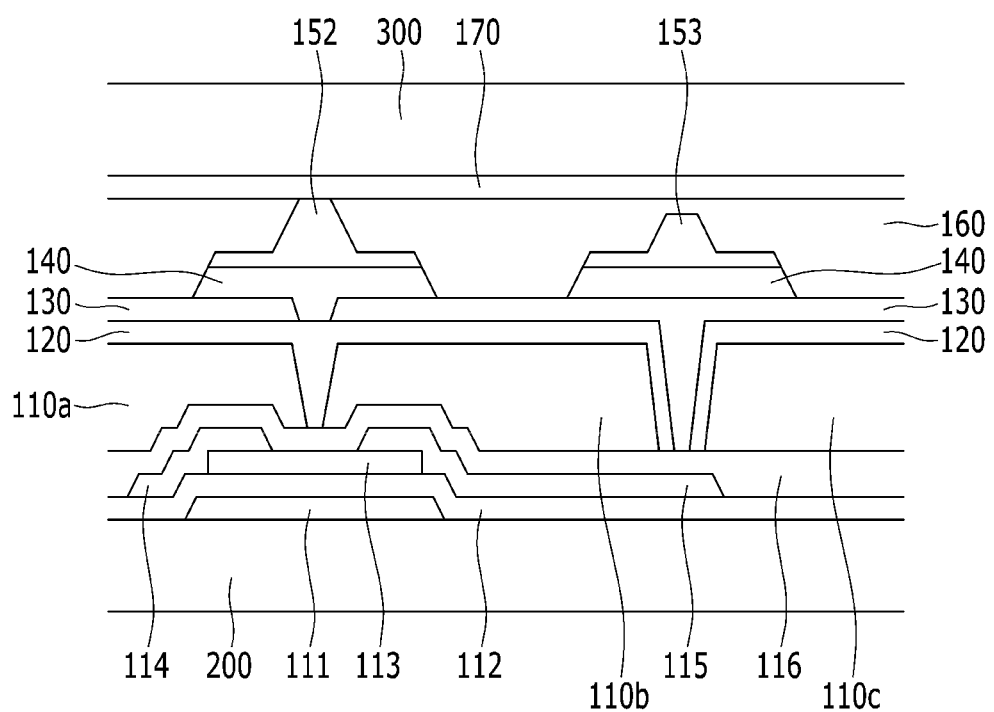
Figure 3:
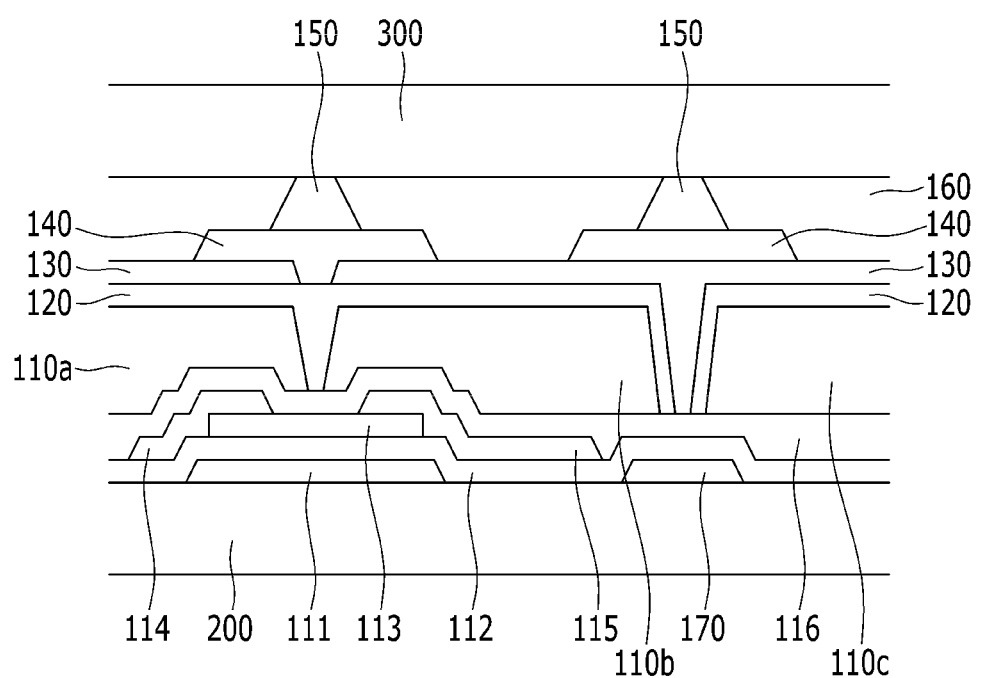
Figure 4:
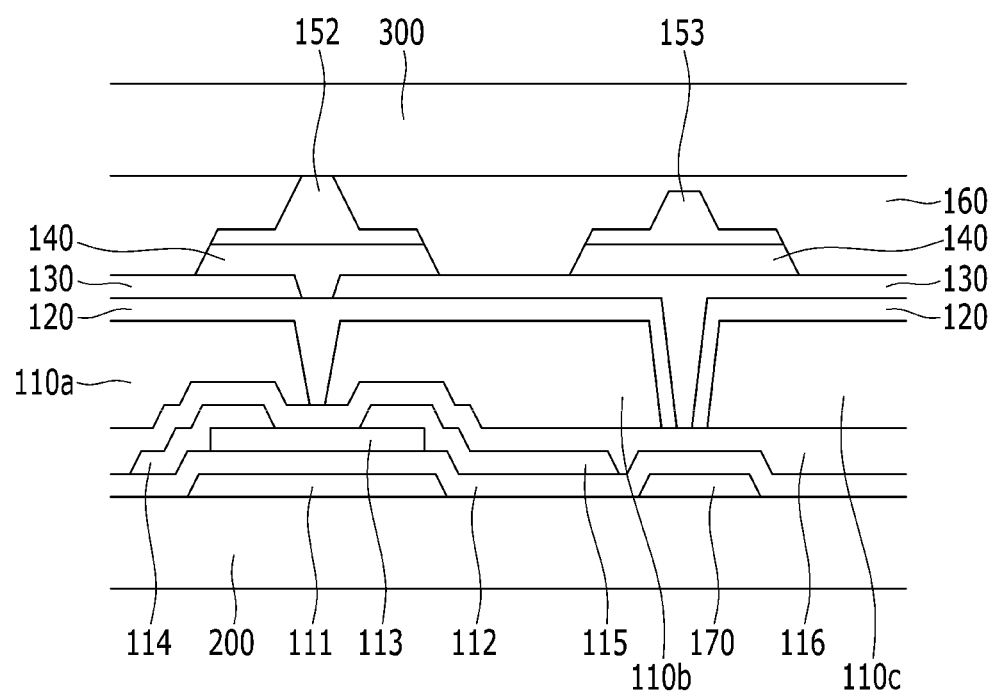

The present invention will be described more fully hereinafter with reference to the accompanying drawings, in which exemplary embodiments of the present invention are shown. This invention may, however, be embodied in many different forms and should not be construed as limited to the exemplary embodiments set forth herein. These exemplary embodiments disclosed in this specification are provided so that this disclosure will satisfy applicable legal requirements.

In the drawings, the thicknesses of layers and regions are exaggerated for clarity. Also the layers and regions illustrated in the figures are schematic in nature and their shapes are not intended to illustrate the precise shape of a component of an article and are not intended to limit the scope of the present invention. It will be understood that when a layer is referred to as being "on" another layer or substrate, it can be directly on the other layer or substrate or an intervening layer therebetween may also be present. Like reference numerals designate like elements throughout the specification. As used in the specification, and in the appended claims, the singular forms "a", "an", and "the" include plural referents unless the context clearly dictates otherwise.

As used herein, when a specific definition is not otherwise provided, the term "alkyl group" refers to a C1 to C20 alkyl group, the term "alkenyl group" refers to a C2 to C20 alkenyl group, the term "cycloalkenyl group" refers to a C3 to C20 cycloalkenyl group, the term "heterocycloalkenyl group" refers to a C3 to C20 heterocycloalkenyl group, the term "aryl group" refers to a C6 to C20 aryl group, the term "arylalkyl group" refers to a C6 to C20 arylalkyl group, the term "alkylene group" refers to a C1 to C20 alkylene group, the term "arylene group" refers to a C6 to C20 arylene group, the term "alkylarylene group" refers to a C6 to C20 alkylarylene group, the term "heteroarylene group" refers to a C3 to C20 heteroarylene group, and the term "alkoxylene group" refers to a C1 to C20 alkoxylene group.

As used herein, when a specific definition is not otherwise provided, the term "substituted" refers to one substituted with halogen (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof, instead of at least one hydrogen.

As used herein, when a specific definition is not otherwise provided, the term "hetero" refers to one including at least one heteroatom N, O, S and/or P in a chemical formula.

As used herein, when a specific definition is not otherwise provided, the term "combination" refers to mixing or copolymerization.

As used herein, a cardo-based resin refers to a resin including at least one functional group selected from the following Chemical Formulae 2-1 to 2-11 in a backbone.

As used herein, unless a specific definition is otherwise provided, a hydrogen atom is bonded at a position when a chemical bond is not drawn where a bond would otherwise appear.

A liquid crystal display (LCD) according to one embodiment includes a thin film transistor positioned on a lower substrate; a plurality of color filters positioned on the thin film transistor and aligned to be spaced apart from each other; an insulation layer positioned on the plurality of color filters; a light-blocking layer positioned on the insulation layer; a transparent layer positioned on the light-blocking layer and having a convex shape; an upper substrate facing the lower substrate; and a liquid crystal layer interposed between the lower substrate and the upper substrate, wherein the light-blocking layer includes an organic black pigment, and the transparent layer having the convex has a different shape from the light-blocking layer.

The light-blocking layer and the transparent layer do not need to have different thicknesses, since they have different shapes. However, the light-blocking layer and the transparent layer have different cross-sections, since they have different shapes.

Figure 5:
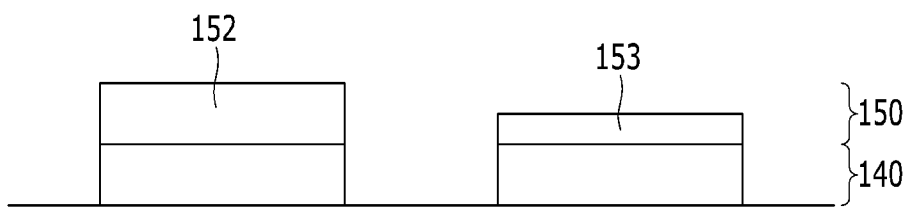
FIG. 5 is a schematic view showing light-blocking layer and transparent layer structures in a conventional liquid crystal display (LCD).

Referring to FIG. 5, a conventional liquid crystal display (LCD) includes a light-blocking layer 140 and a transparent layer 150 positioned on the light-blocking layer 140. Transparent layer 150, which can include a main transparent layer 152 and an auxiliary transparent layer 153, has the same shape as the light-blocking layer 140. In contrast, referring to FIGS. 6 and 7, a liquid crystal display (LCD) according to one embodiment can include one or more transparent layers 150 positioned on a light-blocking layer 140, wherein the transparent layer(s) 150 have a different shape than light blocking layer 140.

Figure 6:
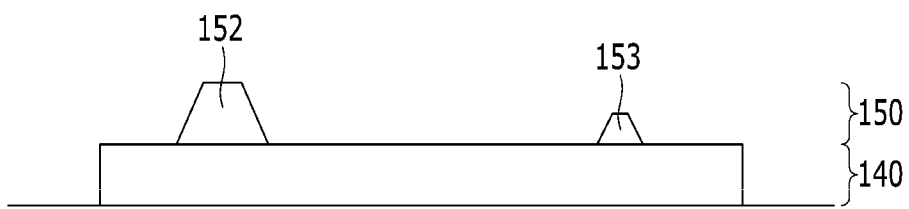
FIGS. 6 and 7 are schematic views showing light-blocking layer and transparent layer structures in liquid crystal displays (LCDs) according to exemplary embodiments.
Figure 7:

When the light-blocking layer and the transparent layer in the liquid crystal display (LCD) have a shape such as illustrated in FIG. 6, a fine pattern may be advantageously formed by decreasing CD (a critical dimension). When the light-blocking layer and the transparent layer in the liquid crystal display (LCD) have a shape such as illustrated in FIG. 7, reliability may be improved.

FIGS. 1 to 4 are cross-sectional views of liquid crystal displays (LCDs) according to exemplary embodiments.

Referring to FIGS. 1 to 4, a thin film transistor is positioned on a lower substrate 200. The thin film transistor may consist of three terminals of a control terminal, an input terminal and an output terminal as a switch. The thin film transistor may include a gate electrode 111, a gate insulating layer 112, a semiconductor 113, a source electrode 114, a drain electrode 115, and a protective layer 116.

Specifically, a gate line and a gate electrode 111 including a storage electrode line are formed on the lower substrate 200.

The gate electrode 111 may include one or more gate lines, and the thin film transistor may include one or more of the gate electrode(s) including the gate line(s). A plurality of the gate lines lies stretched (extends) out in a horizontal direction and transfers a gate signal. A plurality of the gate electrodes may be connected one another and form one protruding portion.

The storage electrode line may be more than one, and mainly be stretched out (extended) in a horizontal direction and transfers a predetermined voltage such as a common voltage (Vcom) and the like.

The gate insulating layer 112 is formed on the gate electrode 111. The gate insulating layer 112 may include silicon nitride, silicon dioxide, or a combination thereof.

On the gate insulating layer 112, a semiconductor 113 which may be formed of amorphous or crystalline silicon and the like is formed. The semiconductor 113 mainly lies stretched (extended) in a vertical direction and may be stretched (extended) out toward a plurality of the gate electrodes.

On the semiconductor 113, more than one pair of ohmic contact members (not shown) is formed. The ohmic contact member may be formed of a material such as silicide or n+ hydrogenated amorphous silicon doped with an n-type impurity in a high concentration.

On the ohmic contact, a data conductor including a data line and a drain electrode 115 is formed.

The data line transfers a data signal and mainly lies stretched (extended) in a vertical direction and thus, crosses with the gate line. Each data line is stretched (extended) toward the gate electrode 111 and includes the source electrode 114 connected one another.

On the thin film transistor, a plurality of color filters 110a, 110b, and 110c are positioned. A plurality of the color filters 110a, 110b, and 110c includes a red color filter, a green color filter and a blue color filter spaced apart from one another. A plurality of the color filters 110a, 110b, and 110c are respectively spaced apart from one another in a horizontal direction but may be formed as a stripe shape along a vertical direction.

On a plurality of the color filters 110a, 110b, and 110c, an insulation layer 120 is positioned. The insulation layer 120 may be positioned in a space among the neighboring color filters. The insulation layer 120 may be formed as an organic layer or an inorganic layer. In exemplary embodiments, the insulation layer is an inorganic layer. When the insulation layer 120 is formed as an organic layer, a step can be difficult to form by using the light-blocking layer and the transparent layer. In addition, the insulation layer 120 may not be patterned or partially patterned through a photo litho process, unlike an overcoating layer which is baked right after coating on the foreside.

On the insulation layer 120, a light-blocking layer 140 is positioned, and on the light-blocking layer 140, a transparent layer 150 is positioned.

The liquid crystal display (LCD) may further include an auxiliary light-blocking layer (not shown) between the insulation layer 120 and the light-blocking layer 140. Herein, the auxiliary light-blocking layer may be positioned in a space between the neighboring color filters.

The light-blocking layer 140 includes an organic black pigment to have high optical density, and the organic black pigment may include a lactam-based organic black, for example, a compound represented by the following Chemical Formula 1.

[Chemical Formula 1]

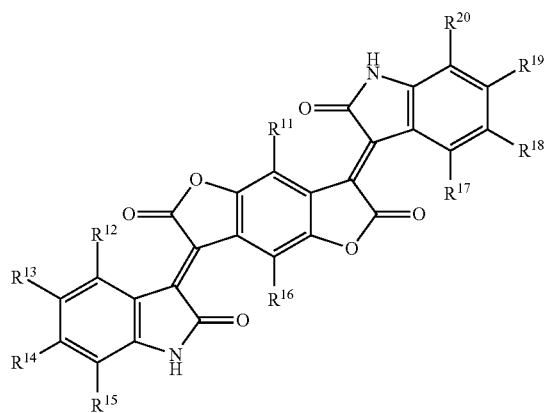

In Chemical Formula 1, $R^{11}$ to $R^{20}$ are the same or different and are each independently hydrogen or substituted or unsubstituted C1 to C10 alkyl. For example, $R^{11}$ to $R^{20}$ may be hydrogen.

The transparent layer having a convex shape may cover a whole or a part of the front surface of the light-blocking layer.

The foreside (front surface) of the light-blocking layer may indicate the side of the light-blocking layer contacting the transparent layer. For example, referring to FIG. 6, the transparent layer having a convex shape in a liquid crystal display (LCD) according to an exemplary embodiment covers a part of the foreside of the light-blocking layer, and referring to FIG. 7, the transparent layer having a convex shape in the liquid crystal display (LCD) according to another exemplary embodiment covers the whole foreside of the light-blocking layer.

The transparent layer may be positioned on the foreside of the light-blocking layer through a photo halftone process as post-described.

The transparent layer may include a main transparent layer 152 and an auxiliary transparent layer 153. As used herein, the main transparent layer and the auxiliary transparent layer are independently present, for example, a side and the like (portion, etc.) of the main transparent layer does not contact a side and the like (portion, etc.) of the auxiliary transparent layer.

The light-blocking layer and the transparent layer are simultaneously formed as post-described. The main transparent layer may play a role of a spacer supporting a space between upper and lower substrates, and the auxiliary transparent layer may play a role of an assistant spacer assisting the main transparent layer and supporting the space between upper and lower substrates. Accordingly, the main transparent layer playing a role of the spacer may be thicker than the auxiliary transparent layer playing a role of the assistant spacer. In this way, when the transparent layer is respectively formed as the main transparent layer and the auxiliary transparent layer, the main transparent layer supports the auxiliary transparent layer even when it has a deteriorated buffering effect and thus, may secure structural stability.

A pixel electrode 130 including an auxiliary pixel electrode may be formed on the insulation layer 120. This auxiliary pixel electrode may be separated each other in the interval of a plurality of gate lines and respectively disposed on top and at the bottom of each gate line and thus, neighbor each other in a column direction. The auxiliary pixel electrode may have an overall quadrangle shape.

On an upper substrate 300, for example, between the upper substrate 300 and a liquid crystal layer 160, a common electrode 170 may be formed, and between the common electrode 170 and the liquid crystal layer 160, an alignment layer (not shown) may be formed. A common electrode 170 may transfer a common voltage.

The common electrode 170 may be directly formed on the lower substrate 200 rather than the upper substrate 300, and a patterned electrode may be used instead of the common electrode 170.

The liquid crystal layer 160 has negative dielectric anisotropy, and the liquid crystal molecules of the liquid crystal layer 160 are aligned with its long axis vertically with the surface of two substrates (upper and lower substrates) when there is no electric field. The liquid crystal layer 160 includes an alignment auxiliary agent including reactive mesogen, and the liquid crystal molecules may have a pretilt with its long axis approximately parallel to the length direction of the pixel electrode 130. The alignment auxiliary agent may be included in an alignment layer rather than the liquid crystal layer.

The structure of the thin film transistor described with reference to FIGS. 1 to 4 is only an example and may be modified into various structures including the thin film transistor structure.

The light-blocking layer and the transparent layer may be formed by coating and drying a light-blocking layer composition, drying and coating a transparent layer composition on the dried light-blocking layer composition, and simultaneously exposing and developing the dried light-blocking layer composition and transparent layer composition.

The exposure may be performed by using a halftone mask. The halftone mask may include a region transmitting about 100% of light during exposure, a region transmitting about 25% to about 35% of light during exposure, a region transmitting about 15% to about 25% of light during exposure, and a region transmitting about 0% of light during exposure, but the structure of the halftone mask is not limited thereto.

Since the transparent layer composition and the light-blocking layer composition are simultaneously exposed and developed after coating the transparent layer composition for realizing a spacer and a step on a light-blocking layer composition for obtaining optical density without exposing and developing the light-blocking layer composition, optical density per 1 μm of the light-blocking layer and optical density per 1 μm of the transparent layer have a difference of greater than or equal to about 1.0. For example, the difference between the optical density per 1 μm of the light-blocking layer and the optical density per 1 μm of the transparent layer may be greater than or equal to about 1.0, for example, about 1.5.

In exemplary embodiments, the light-blocking layer and the transparent layer on the light-blocking layer may be manufactured as follows.

(1) Application and Film Formation

The light-blocking layer composition is coated to have a desired thickness on a substrate which undergoes a predetermined pretreatment such as a glass substrate or an IZO substrate and the like, using a spin or slit coating method, a roll coating method, a screen-printing method, an applicator method, and the like, and then the coated substrate is heated at a temperature ranging from about 70° C. to about 100° C. for about 1 minute to about 10 minutes to remove a solvent. Then, the transparent layer composition is coated using the same method and heated (dried) to obtain a film.

(2) Exposure

The resultant film is radiated by an active ray of about 200 nm to about 500 nm after putting a mask including a halftone part for providing a light-blocking layer pattern and a full tone part for providing a transparent layer pattern to form a desired pattern. The radiation is performed by using a light source such as a mercury lamp with a low pressure, a high pressure, or an ultrahigh pressure, a metal halide lamp, an argon gas laser, and the like. An X ray, an electron beam, and the like may be also used depending on a case.

Exposure process uses, for example, a light dose of about 500 mJ/cm2 or less (with a 365 nm sensor) when a high pressure mercury lamp is used. However, the light dose may vary depending on kinds of each component of the black photosensitive resin composition, its combination ratio, and a dry film thickness.

(3) Development

After the exposure process, an alkali aqueous solution is used to develop the exposed film by dissolving and removing an unnecessary part except the exposed part, forming an image pattern.

(4) Post-Treatment

The developed image pattern may be heated again, in order to accomplish excellent quality in terms of heat resistance, photo resistance, close contacting properties, crack-resistance, chemical resistance, high strength, storage stability, and the like.

Hereinafter, the light-blocking layer composition and transparent layer composition are described.

The light-blocking layer composition includes a binder resin, a reactive unsaturated compound, a photopolymerization initiator, an organic black pigment, and a solvent.

The light-blocking layer composition may further include a color calibrator. Examples of a color calibrator may include without limitation an anthraquinone-based pigment, a perylene-based pigment, a phthalocyanine-based pigment, and/or an azo-based pigment, and the like.

The organic black pigment may be used with a dispersing agent for dispersion. For example, the pigment may be surface-pretreated with a dispersing agent, or the pigment and dispersing agent may be added together during preparation of the light-blocking layer composition.

The dispersing agent may be a non-ionic dispersing agent, an anionic dispersing agent, and/or a cationic dispersing agent, and the like. Examples of the dispersing agent may include without limitation polyalkylene glycol and esters thereof, polyoxyalkylenes, polyhydric alcohol ester alkylene oxide addition products, alcohol alkylene oxide addition products, sulfonate esters, sulfonate salts, carboxylate esters, carboxylate salts, alkyl amide alkylene oxide addition products, alkyl amines, and the like, and these may be used singularly or as a mixture of two or more.

Commercially available examples of the dispersing agent may include without limitation DISPERBYK-101, DISPERBYK-130, DISPERBYK-140, DISPERBYK-160, DISPERBYK-161, DISPERBYK-162, DISPERBYK-163, DISPERBYK-164, DISPERBYK-165, DISPERBYK-166, DISPERBYK-170, DISPERBYK-171, DISPERBYK-182, DISPERBYK-2000, and/or DISPERBYK-2001 made by BYK Co., Ltd.; EFKA-47, EFKA-47EA, EFKA-48, EFKA-49, EFKA-100, EFKA-400, and/or EFKA-450 made by EFKA Chemicals Co.; Solsperse 5000, Solsperse 12000, Solsperse 13240, Solsperse 13940, Solsperse 17000, Solsperse 20000, Solsperse 24000GR, Solsperse 27000, and/or Solsperse 28000 made by Zeneka Co.; and/or PB711 and/or PB821 made by Ajinomoto Inc.

The light-blocking layer composition may include the dispersing agent in an amount of about 0.1 wt % to about 15 wt % based on the total amount (total weight, 100 wt %) of the light-blocking layer composition. When the dispersing agent is included in an amount within this range, the light-blocking layer composition can have improved dispersion properties.

The organic black pigment may be pre-treated using a water-soluble inorganic salt and a wetting agent. When the organic black pigment is pre-treated, an average particle diameter of the organic black pigment may become finer.

The pre-treating may be performed by kneading the pigment with a water-soluble inorganic salt and a wetting agent and then, filtering and washing the kneaded pigment.

The kneading may be performed at a temperature of about 40° C. to about 100° C., and the filtering and washing may be performed by filtering the pigment after washing away an inorganic salt with water and the like.

Examples of the water-soluble inorganic salt may include without limitation sodium chloride, potassium chloride, and the like, and mixtures thereof. The wetting agent may help uniformly mix the pigment with the water-soluble inorganic salt and be pulverized. Examples of the wetting agent include without limitation alkylene glycol monoalkyl ethers such as ethylene glycol monoethylether, propylene glycol monomethylether, diethylene glycol monomethylether, and the like, and alcohols such as ethanol, isopropanol, butanol, hexanol, cyclohexanol, ethylene glycol, diethylene glycol, polyethylene glycol, glycerine polyethylene glycol, and the like. These may be used singularly or as a mixture of two or more.

The light-blocking layer composition may include the organic black pigment in an amount of about 1 wt % to about 30 wt %, for example about 2 wt % to about 20 wt %, based on the total amount (total weight, 100 wt %) of the light-blocking layer composition. In some embodiments, the light-blocking layer composition may include the organic black pigment in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the organic black pigment can be in a range from about any of the foregoing amounts to about any other of the foregoing amounts.

When the pigment is included in an amount within this range, resolution and pattern linearity can be improved.

The binder resin may include a cardo-based binder resin, an acrylic-based binder resin, or a combination thereof.

The binder resin may be a cardo-based binder resin. When the binder resin is a cardo-based binder resin, the light-blocking layer composition including the cardo-based binder resin can have excellent developability and sensitivity during photo-curing and thus, fine pattern-forming capability. In particular, when the cardo-based binder resin is used, reliability of liquid crystal display (LCD) may be secured.

The cardo-based binder resin may include a repeating unit represented by the following Chemical Formula 2.

[Chemical Formula 2]

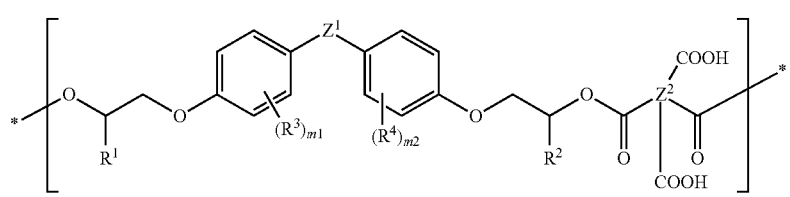

In Chemical Formula 2, $R^1$ and $R^2$ are the same or different and are each independently hydrogen or a substituted or unsubstituted (meth)acryloyloxy alkyl group, $R^3$ and $R^4$ are the same or different and are each independently hydrogen, halogen or substituted or unsubstituted C1 to C20 alkyl, and each $Z^1$ is independently a single bond, O, CO, $SO_2$, $CR^7R^8$, $SiR^9R^{10}$ (wherein, $R^7$ to $R^{10}$ are the same or different and are each independently hydrogen or substituted or unsubstituted C1 to C20 alkyl) or a linking group represented by one of the following Chemical Formulae 2-1 to 2-11:

[Chemical Formula 2-1]

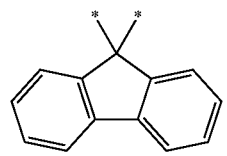

[Chemical Formula 2-2]

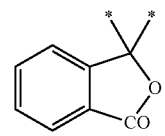

[Chemical Formula 2-3]

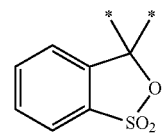

-continued

[Chemical Formula 2-4]

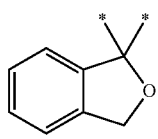

[Chemical Formula 2-5]

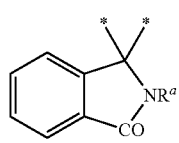

wherein in Chemical Formula 2-5, $R^a$ is hydrogen, ethyl, $C_2H_4Cl$, $C_2H_4OH$, $CH_2CH=CH_2$, or phenyl,

[Chemical Formula 2-6]

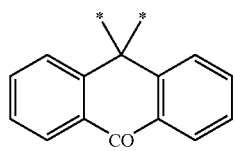

[Chemical Formula 2-7]

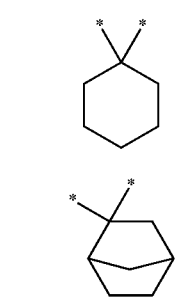

[Chemical Formula 2-8]

[Chemical Formula 2-9]

[Chemical Formula 2-10]

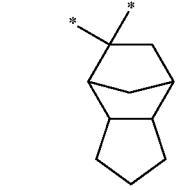

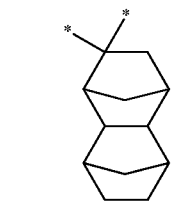

[Chemical Formula 2-11]

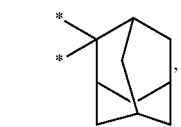

each $Z^2$ is independently an acid dianhydride residual group, m1 and m2 are the same or different and are each independently an integer ranging from 0 to 4, and n is an integer ranging from 1 to 30.

The cardo-based binder resin may include a functional group represented by the following Chemical Formula 3 at least one terminal end or at both terminal ends:

[Chemical Formula 3]

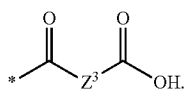

wherein in Chemical Formula 3, $Z^3$ is represented by the following Chemical Formulae 3-1 to 3-7:

[Chemical Formula 3-1]

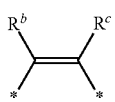

wherein in Chemical Formula 3-1, $R^b$ and $R^c$ are the same or different and are each independently hydrogen, substituted or unsubstituted C1 to C20 alkyl, an ester group or an ether group,

[Chemical Formula 3-2]

[Chemical Formula 3-3]

[Chemical Formula 3-4]

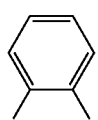

[Chemical Formula 3-5]

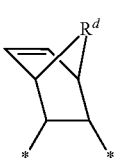

wherein in Chemical Formula 3-5, $R^d$ is O, S, NH, substituted or unsubstituted C1 to C20 alkylene, C1 to C20 alkylamine or C2 to C20 alkenylamine,

[Chemical Formula 3-6]

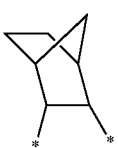

-continued

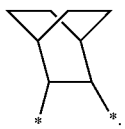

[Chemical Formula 3-7]

The cardo-based binder resin may be for example prepared by mixing at least two of a fluorine-containing compound such as 9,9-bis(4-oxiranylmethoxyphenyl)fluorine, and the like; an anhydride compound such as benzene tetracarboxylic acid dianhydride, naphthalene tetracarboxylic acid dianhydride, biphenyltetracarboxylic acid dianhydride, benzophenone tetracarboxylic acid dianhydride, pyromellitic dianhydride, cyclobutane tetracarboxylic acid dianhydride, perylene tetracarboxylic acid dianhydride, tetrahydrofuran tetracarboxylic acid dianhydride, tetrahydrophthalic anhydride, and the like; a glycol compound such as ethylene glycol, propylene glycol, polyethylene glycol, and the like; an alcohol compound such as methanol, ethanol, propanol, n-butanol, cyclohexanol, benzylalcohol, and the like; a solvent compound such as propylene glycol methylethylacetate, N-methylpyrrolidone, and the like; a phosphorus compound such as triphenylphosphine, and the like; and an amine or ammonium salt compound such as tetramethylammonium chloride, tetraethylammonium bromide, benzyldiethylamine, triethylamine, tributylamine, benzyltriethylammonium chloride, and the like.

The cardo-based binder resin may have a weight average molecular weight of about 500 to about 50,000 g/mol, for example about 1,000 to about 30,000 g/mol. When the cardo-based binder resin has a weight average molecular weight within the above range, a pattern may be well formed without loss of a film thickness during development.

The acrylic-based binder resin is a copolymer of a first ethylenic unsaturated monomer and a second ethylenic unsaturated monomer that is copolymerizable therewith, and is a resin including at least one acrylic-based repeating unit.

The first ethylenic unsaturated monomer is an ethylenic unsaturated monomer including at least one carboxyl group. Examples of the first ethylenic unsaturated monomer include without limitation acrylic acid, methacrylic acid, maleic acid, itaconic acid, fumaric acid, and the like, and combinations thereof.

The acrylic-based resin may include the first ethylenic unsaturated monomer in an amount of about 5 to about 50 wt %, for example about 10 to about 40 wt %, based on the total amount (total weight, 100 wt %) of the acrylic-based resin.

Examples of the second ethylenic unsaturated monomer may include without limitation aromatic vinyl compounds such as styrene, α-methylstyrene, vinyl toluene, vinylbenzylmethylether and the like; unsaturated carboxylate ester compounds such as methyl(meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; unsaturated carboxylic acid amino alkyl ester compounds such as 2-aminoethyl(meth)acrylate, 2-dimethylaminoethyl(meth)acrylate, and the like; carboxylic acid vinyl ester compounds such as vinyl acetate, vinyl benzoate, and the like; unsaturated carboxylic acid glycidyl ester compounds such as glycidyl(meth)acrylate, and the like; vinyl cyanide compounds such as (meth)acrylonitrile and the like; unsaturated amide compounds such as (meth)acrylamide, and the like; and the like. These may be used singularly or as a mixture of two or more.

Examples of the acrylic-based resin may include without limitation a methacrylic acid/benzylmethacrylate copolymer, a methacrylic acid/benzyl methacrylate/styrene copolymer, a methacrylic acid/benzylmethacrylate/2-hydroxyethylmethacrylate copolymer, a methacrylic acid/benzyl methacrylate/styrene/2-hydroxyethylmethacrylate copolymer, and the like, but are not limited thereto. These may be used singularly or as a mixture of two or more.

The acrylic-based resin may have a weight average molecular weight of about 3,000 g/mol to about 150,000 g/mol, for example about 5,000 g/mol to about 50,000 g/mol, and as another example about 7,000 g/mol to about 30,000 g/mol. When the acrylic-based resin has a weight average molecular weight within the above range, the light-blocking layer composition may have excellent physical and chemical properties.

The acrylic-based resin may have an acid value of about 15 mgKOH/g to about 150 mgKOH/g, for example about 80 mgKOH/g to about 130 mgKOH/g. When the acrylic-based resin has an acid value within the above range, a pixel pattern may have excellent resolution.

When the cardo-based binder resin is mixed with the acrylic-based binder resin, a (weight) ratio the cardo-based binder resin and the acrylic-based binder resin in the first composition may be about 99:1 to about 50:50.

In some embodiments, a mixture of the cardo-based binder resin and the acrylic-based binder resin may include the cardo-based binder resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the amount of the cardo-based binder resin can be in a range from about any of the foregoing amounts to about any other of the foregoing amounts.

In some embodiments, a mixture of the cardo-based binder resin and the acrylic-based binder resin may include the acrylic-based binder resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the acrylic-based binder resin can be in a range from about any of the foregoing amounts to about any other of the foregoing amounts.

When the acrylic-based binder resin is included in an amount that is greater than the amount of the cardo-based binder resin, chemical resistance and reliability may be deteriorated.

The light-blocking layer composition may include the binder resin in an amount of about 1 wt % to about 30 wt %, for example about 2 wt % to about 20 wt %, based on the total amount (total weight, 100 wt %) of the light-blocking layer composition. In some embodiments, the light-blocking layer composition may include the binder resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the binder resin can be in a range from about any of the foregoing amounts to about any other of the foregoing amounts.

In exemplary embodiments, the light-blocking layer composition may include the cardo-based binder resin in an amount of about 1 wt % to about 20 wt % based on the total amount (total weight, 100 wt %) of the light-blocking layer composition, and the light-blocking layer composition may include the acrylic-based binder resin in an amount of about 1 wt % to about 20 wt % based on the total amount (total weight, 100 wt %) of the light-blocking layer composition.

When the binder resin is included in an amount within the above range, excellent resolution may be realized.

The reactive unsaturated compound may be a monomer and/or oligomer and may be mono-functional and/or multi-functional ester of (meth)acrylic acid including at least one ethylenic unsaturated double bond.

The reactive unsaturated compound has the ethylenic unsaturated double bond and thus, may cause sufficient polymerization during exposure in a pattern-forming process and form a pattern that can have excellent heat resistance, light resistance, and chemical resistance.

Examples of the reactive unsaturated compound may include without limitation ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy(meth)acrylate, ethylene glycol monomethylether(meth)acrylate, trimethylol propane tri(meth)acrylate, tris(meth)acryloyloxyethyl phosphate, novolac epoxy(meth)acrylate, and the like, and combinations thereof.

Commercially available examples of the reactive unsaturated compound include the following without limitation. Examples of the mono-functional (meth)acrylic acid ester may include without limitation Aronix M-101®, M-111®, and/or M-114® (Toagosei Chemistry Industry Co., Ltd.); KAYARAD TC-110S® and/or TC-120S® (Nippon Kayaku Co., Ltd.); V-158® and/or V-2311® (Osaka Organic Chemical Ind., Ltd.), and the like. Examples of a difunctional (meth)acrylic acid ester may include without limitation Aronix M-210®, M-240®, and/or M-6200® (Toagosei Chemistry Industry Co., Ltd.); KAYARAD HDDA®, HX-220®, and/or R-604® (Nippon Kayaku Co., Ltd.); V-260®, V-312®, and/or V-335 HP® (Osaka Organic Chemical Ind., Ltd.); and the like. Examples of a tri-functional (meth)acrylic acid ester may include without limitation Aronix M-309®, M-400®, M-405®, M-450®, M-7100®, M-8030®, and/or M-8060® (Toagosei Chemistry Industry Co., Ltd.); KAYARAD TMPTA®, DPCA-20®, DPCA-30®, DPCA-60®, and/or DPCA-120® (Nippon Kayaku Co., Ltd.); V-295®, V-300®, V-360®, V-GPT®, V-3PA®, and/or V-400® (Osaka Yuki Kayaku Kogyo Co. Ltd.); and the like. These may be used singularly or as a mixture of two or more.

The reactive unsaturated compound may be treated with acid anhydride to improve developability.

The light-blocking layer composition may include the reactive unsaturated compound in an amount of about 1 wt % to about 20 wt %, for example about 1 wt % to about 10 wt %, based on the total amount (total weight 100 wt %) of the light-blocking layer composition. In some embodiments, the light-blocking layer composition may include the reactive unsaturated compound in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the reactive unsaturated compound can be in a range from about any of the foregoing amounts to about any other of the foregoing amounts.

When the reactive unsaturated compound is included in an amount within the above range, the reactive unsaturated compound can be sufficiently cured during exposure in pattern-forming to improve reliability.

The photopolymerization initiator may be a generally-used photopolymerization initiator in a photosensitive resin composition. Examples of the photopolymerization initiator may include without limitation acetophenone-based compounds, benzophenone-based compounds, thioxanthone-based compounds, benzoin-based compounds, oxime-based compounds, and the like, and mixtures thereof.

Examples of the acetophenone-based compound may include without limitation 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like, and mixtures thereof.

Examples of the benzophenone-based compound may include without limitation benzophenone, benzoyl benzoate, methyl benzoyl benzoate, 4-phenyl benzophenone, hydroxy benzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like, and mixtures thereof.

Examples of the thioxanthone-based compound may include without limitation thioxanthone, 2-methylthioxanthone, isopropyl thioxanthone, 2,4-diethyl thioxanthone, 2,4-diisopropyl thioxanthone, 2-chlorothioxanthone, and the like, and mixtures thereof.

Examples of the benzoin-based compound may include without limitation benzoin, benzoin methyl ether, benzoin ethyl ether, benzoin isopropyl ether, benzoin isobutyl ether, benzyldimethylketal, and the like, and mixtures thereof.

Examples of the triazine-based compound may include without limitation 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloro methyl)-s-triazine, 2-biphenyl-4,6-bis(trichloro methyl)-s-triazine, bis(trichloromethyl)-6-styryl-s-triazine, 2-(naphtho1-yl)-4,6-bis(trichloromethyl)-s-triazine, 2-(4-methoxynaphtho1-yl)-4,6-bis(trichloromethyl)-s-triazine, 2-4-bis(tri chloromethyl)-6-piperonyl-s-triazine, 2-4-bis(trichloromethyl)-6-(4-methoxystyryl)-s-triazine, and the like, and mixtures thereof.

Examples of the oxime-based compound may include without limitation O-acyloxime-based compounds, 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and the like, and mixtures thereof. Examples of the O-acyloxime-based compound may include without limitation 1,2-octandione, 2-dimethylamino-2-(4-methylbenzyl)-1-(4-morpholin-4-yl-phenyl)butan-1-one, 1-(4-phenylsulfanyl phenyl)butane-1,2-dione 2-oxime-O-benzoate, 1-(4-phenylsulfanyl phenyl)-octane-1,2-dione 2-oxime-O-benzoate, 1-(4-phenylsulfanyl phenyl)-octan-1-one oxime-O-acetate, 1-(4-phenylsulfanyl phenyl)butan-1-one oxime-O-acetate, and the like, and combinations thereof.

Other examples of the photopolymerization initiator may include without limitation carbazole-based compounds, diketone-based compounds, sulfonium borate-based compounds, diazo-based compounds, imidazole-based compounds, biimidazole-based compounds, and the like, and mixtures thereof, instead of or in addition to the photopolymerization initiators noted herein.

The photopolymerization initiator may be used with a photosensitizer capable of causing a chemical reaction by absorbing light and becoming excited and then, transferring its energy.

Examples of the photosensitizer may include without limitation tetraethylene glycol bis-3-mercapto propionate, pentaerythritol tetrakis-3-mercapto propionate, dipentaerythritol tetrakis-3-mercapto propionate, and the like, and mixtures thereof.

The light-blocking layer composition may include the photopolymerization initiator in an amount of about 0.05 to about 5 wt %, for example about 0.1 to about 5 wt %, based on the total amount (total weight, 100 wt %) of the light-blocking layer composition. In some embodiments, the light-blocking layer composition may include the photopolymerization initiator in an amount of about 0.05, 0.06, 0.07, 0.08, 0.09, 0.1, 0.2, 0.3, 0.4, 0.5, 0.6, 0.7, 0.8, 0.9, 1, 2, 3, 4, or 5 wt %. Further, according to some embodiments of the present invention, the amount of the photopolymerization initiator can be in a range from about any of the foregoing amounts to about any other of the foregoing amounts.

When the photopolymerization initiator is included in an amount within the above range, excellent reliability may be secured due to sufficiently curing during exposure in a pattern-forming process.

The solvent is a material having compatibility with the pigment, the binder resin, the reactive unsaturated compound, and the photopolymerization initiator but not reacting therewith.

Examples of the solvent may include without limitation alcohols such as methanol, ethanol, and the like; ethers such as dichloroethyl ether, n-butyl ether, diisoamyl ether, methylphenyl ether, tetrahydrofuran, and the like; glycol ethers such as ethylene glycol monomethylether, ethylene glycol monoethylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol methylether acetate, propylene glycol propylether acetate, and the like; aromatic hydrocarbons such as toluene, xylene and the like; ketones such as methylethylketone, cyclohexanone, 4-hydroxy-4-methyl-2-pentanone, methyl-n-propyl ketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactate esters such as methyl lactate, ethyl lactate, and the like; oxy acetic acid alkyl esters such as oxy methyl acetate, oxy ethyl acetate, butyl oxyacetate, and the like; alkoxy acetic acid alkyl esters such as methoxy methyl acetate, methoxy ethyl acetate, methoxy butyl acetate, ethoxy methyl acetate, ethoxy ethyl acetate, and the like; 3-oxy propionic acid alkyl esters such as 3-oxy methyl propionate, 3-oxy ethyl propionate, and the like; 3-alkoxy propionic acid alkyl esters such as 3-methoxy methyl propionate, 3-methoxy ethyl propionate, 3-ethoxy ethyl propionate, 3-ethoxy methyl propionate, and the like; 2-oxy propionic acid alkyl esters such as 2-oxy methyl propionate, 2-oxy ethyl propionate, 2-oxy propyl propionate, and the like; 2-alkoxy propionic acid alkyl esters such as 2-methoxy methyl propionate, 2-methoxy ethyl propionate, 2-ethoxy ethyl propionate, 2-ethoxy methyl propionate, and the like; 2-oxy-2-methyl propionic acid esters such 2-oxy-2-methyl methyl propionate, 2-oxy-2-methyl ethyl propionate, and the like; monooxy monocarboxylic acid alkyl esters of 2-alkoxy-2-methyl alkyl propionates such as 2-methoxy-2-methyl methyl propionate, 2-ethoxy-2-methyl ethyl propionate, and the like; esters such as 2-hydroxy ethyl propionate, 2-hydroxy-2-methyl ethyl propionate, hydroxy ethyl acetate, 2-hydroxy-3-methyl methyl butanoate, and the like; and/or ketonate esters such as ethyl pyruvate, and the like. Additionally, a high boiling point solvent such as N-methylformamide, N,N-dimethylformamide, N-methylformanilide, N-methylacetamide, N,N-dimethylacetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, and/or phenyl cellosolve acetate, and the like may be also used.

Considering miscibility and reactivity, glycol ethers such as ethylene glycol monoethylether, and the like; ethylene glycol alkylether acetates such as ethyl cellosolve acetate, and the like; esters such as 2-hydroxy ethyl propionate, and the like; carbitols such as diethylene glycol monomethylether, and the like; and/or propylene glycol alkylether acetates such as propylene glycol methylether acetate, propylene glycol propylether acetate and the like may be used.

The solvent is used in a balance amount, for example about 40 wt % to about 90 wt % based on the total amount (total weight, 100 wt %) of the light-blocking layer composition. In some embodiments, the light-blocking layer composition may include the solvent in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the solvent can be in a range from about any of the foregoing amounts to about any other of the foregoing amounts.

When the solvent is included in an amount within the above range, the light-blocking layer can have an appropriate viscosity which can result in improved processibility.

The light-blocking layer composition may further include an additive(s). Examples of the additives include without limitation malonic acid, 3-amino-1,2-propanediol, silane-based coupling agents, leveling agents, fluorine-based surfactants, radical polymerization initiators, and the like, and combinations thereof.

The silane-based coupling agent may have a reactive substituent such as but not limited to a vinyl group, a carboxyl group, a methacryloxy group, an isocyanate group, an epoxy group, and the like, in order to improve close-contacting (adhesive) properties with a substrate.

Examples of the silane-based coupling agent may include without limitation trimethoxysilyl benzoic acid, γ-methacryloxypropyl trimethoxysilane, vinyl triacetoxysilane, vinyl trimethoxysilane, γ-isocyanate propyl triethoxysilane, γ-glycidoxypropyltrimethoxysilane, β-(3,4-epoxycyclohexyl) ethyltrimethoxysilane, and the like. These may be used singularly or in a mixture of two or more.

The silane-based coupling agent may be included in an amount of about 0.01 parts by weight to 10 parts by weight based on about 100 parts by weight of the light-blocking layer composition.

In addition, the light-blocking layer composition may further include a surfactant, for example a fluorine-based surfactant, in order to improve coating properties and prevent a defect if necessary.

Examples of commercial fluorine-based surfactants may include without limitation BM-1000® and/or BM-1100® (BM Chemie Inc.); MEGAFACE F 142D®, F 172®, F 173®, and/or F 183® (Dainippon Ink Kagaku Kogyo Co., Ltd.); FULORAD FC-135®, FULORAD FC-170C®, FULORAD FC-430®, and/or FULORAD FC-431® (Sumitomo 3M Co., Ltd.); SURFLON S-112®, SURFLON S-113®, SURFLON S-131®, SURFLON S-141®, and/or SURFLON S-145® (Asahi Glass Co., Ltd.); and SH-28PA®, SH-190®, SH-193®, SZ-6032®, and/or SF-8428® (Toray Silicone Co., Ltd.), and the like, and mixtures thereof.

The surfactant may be used in an amount of about 0.001 parts by weight to 5 parts by weight based on about 100 parts by weight of the light-blocking layer composition.

Furthermore, the light-blocking layer composition may include one or more other additives such as but not limited to an antioxidant, a stabilizer, and the like in a predetermined amount unless they deteriorate properties of the light-blocking layer composition.

The transparent layer composition may include a binder resin, a reactive unsaturated compound, a photopolymerization initiator, and a solvent.

The transparent layer composition is to realize a spacer and a step but does not necessarily require high optical density and thus does not necessarily include an organic black pigment. In other words, the transparent layer composition may include a binder resin, a reactive unsaturated compound, a photopolymerization initiator and a solvent, and further may optionally include an organic black pigment if necessary. In addition, the transparent layer composition may further include one or more of the additive(s) described herein for the light-blocking layer composition.

Each component including the binder resin, the reactive unsaturated compound, the photopolymerization initiator, the organic black pigment and the solvent included in the transparent layer composition is the same as described in the light-blocking layer composition.

The transparent layer composition may include the binder resin in an amount of about 3 wt % to about 70 wt %, for example, about 3 wt % to about 60 wt %, based on the total amount (total weight, 100 wt %) of the transparent layer composition. In some embodiments, the transparent layer composition may include the binder resin in an amount of about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the binder resin can be in a range from about any of the foregoing amounts to about any other of the foregoing amounts.

When the binder resin is included in an amount within the above range, excellent resolution may be obtained.

The transparent layer composition may include the reactive unsaturated compound in an amount of about 2 wt % to about 40 wt %, for example, about 3 to about 30 wt %, based on the total amount (total weight, 100 wt %) of the transparent layer composition. In some embodiments, the transparent layer composition may include the reactive unsaturated compound in an amount of about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the reactive unsaturated compound can be in a range from about any of the foregoing amounts to about any other of the foregoing amounts.

When the reactive unsaturated compound is included in an amount within the above range, the transparent layer composition can be sufficiently cured during exposure in a pattern forming process, securing excellent reliability.

The transparent layer composition may include the photopolymerization initiator in an amount of about 0.1 wt % to about 5 wt %, for example, about 0.2 wt % to about 5 wt %, based on the total amount (total weight, 100 wt %) of the transparent layer composition. In some embodiments, the transparent layer composition may include the photopolymerization initiator in an amount of about 0.1, 0.2, 0.3, 0.4, 0.5, 0.6, 0.7, 0.8, 0.9, 1, 2, 3, 4, or 5 wt %. Further, according to some embodiments of the present invention, the amount of the photopolymerization initiator can be in a range from about any of the foregoing amounts to about any other of the foregoing amounts.

When the photopolymerization initiator is included in an amount within the above range, the transparent layer composition can be sufficiently cured during exposure in a pattern forming process, obtaining excellent reliability.

The transparent layer composition may include the solvent in a balance amount, for example, in an amount of about 40 wt % to about 90 wt % based on the total amount (total weight, 100 wt %) of the transparent layer composition. In some embodiments, the transparent layer composition may include the solvent in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the solvent can be in a range from about any of the foregoing amounts to about any other of the foregoing amounts.

When the solvent is included in an amount within the above range, the transparent layer composition can have appropriate viscosity, providing excellent processibility.

The solvent of the transparent layer composition may have less solubility than the solvent of the light-blocking layer composition. Examples of the solvent of the light-blocking layer composition may include without limitation PGMEA, PGME, EDM, 3-MBA, and/or EEP and the like, and examples of the solvent of the transparent layer composition may include without limitation PGMEA, 3-MBA, n-butyl acetate, n-pentyl acetate, and/or n-hexyl acetate and the like.

Hereinafter, the present invention is illustrated in more detail with reference to the following examples. These examples, however, are not in any sense to be interpreted as limiting the scope of the invention.

(Preparation of Light-Blocking Layer and Transparent Layer)

PREPARATION EXAMPLES 1 TO 3

Each light-blocking layer composition and transparent layer composition according to Preparation Example 1 to Preparation Example 3 is prepared by using the following components in the following compositions provided in the following Tables 1 to 3.

Specifically, a photopolymerization initiator is dissolved in a solvent, the solution is sufficiently agitated at room temperature for greater than or equal to 30 minutes, a binder resin and a reactive unsaturated compound are sequentially added thereto, and the mixture is agitated at room temperature for about 1 hour. Subsequently, other additives are added to the agitated solution, the mixture is agitated for about 10 minutes, then, a pigment is added thereto, and the obtained mixture is agitated at room temperature for greater than or equal to 2 hours. Then, the product is three times filtered to remove impurities therein, obtaining the light-blocking layer compositions and transparent layer compositions.

PREPARATION EXAMPLE 1

Preparation of Light-Blocking Layer Composition

TABLE 1

| (unit: g) | | |
|---|---|---|
| Components | | Amount |
| Binder resin | cardo-based binder resin (V259ME, Nippon Steel) | 9.64 |
| Reactive unsaturated compound | dipentaerythritolhexaacrylate (Nippon Shokubai) | 2.566 |
| Photopolymerization initiator | OXE01 (BASF) | 0.464 |
| Solvent | PGMEA | 63.211 |
|  | EDM | 15.343 |
| Black pigment | Mill base including compound represented by the following Chemical Formula A (Mikuni, PWC 18%) [Chemical Formula A] | 6.397 |

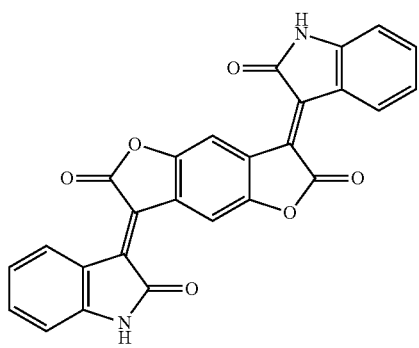 [SMILES: O=C1Nc2ccccc2/C1=C1\C(=O)Oc2cc3c(cc21)OC(=O)/C3=C1/C(=O)Nc2ccccc21]

|  | Mill base including carbon black (Tokushiki Co., Ltd., PWC 25%) | 1.438 |
|---|---|---|
| additive | γ-glycidoxy propyl trimethoxysilane (S-510, Chisso Corporation) | 0.941 |

PREPARATION EXAMPLE 2

Preparation of Transparent Layer Composition

TABLE 2

| (unit: g) | | |
|---|---|---|
| Components | | Amount |
| Binder resin | cardo-based binder resin (V259ME, Nippon Steel) | 4.718 |
|  | acryl-based binder resin (BX-04, Nippon Shokubai) | 19.456 |
| Reactive unsaturated compound | dipentaerythritolhexaacrylate (Nippon Shokubai) | 8.728 |
| Photopolymerization initiator | OXE01 (BASF) | 0.489 |
| Solvent | n-butyl acetate | 65.039 |
| Additive | γ-glycidoxy propyl trimethoxysilane (S-510, Chisso Corporation) | 1.570 |

PREPARATION EXAMPLE 3

Preparation of Transparent Layer Composition

TABLE 3

(unit: g)

| | Components | Amount |
|---|---|---|
| Binder resin | cardo-based binder resin (V259ME, Nippon Steel) | 18.200 |
| Reactive unsaturated compound | dipentaerythritolhexaacrylate (Nippon Shokubai) | 4.368 |
| Photopolymerization initiator | OXE01 (BASF) | 1.303 |
| Solvent | n-butyl acetate | 75.504 |
| Black pigment | Mill base including compound represented by the following Chemical Formula A (Mikuni, PWC 18%) [Chemical Formula A] | 1.958 |

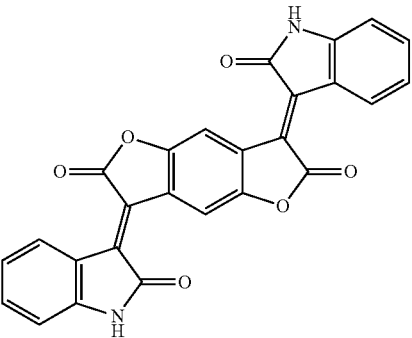 [SMILES: O=C1Nc2ccccc2/C1=C1\C(=O)Oc2cc3c(cc21)OC(=O)/C3=C1/C(=O)Nc2ccccc21]

| | | |
|---|---|---|
| | Mill base including carbon black (Tokushiki Co., Ltd., PWC 25%) | 0.337 |
| Additive | γ-glycidoxy propyl trimethoxysilane (S-510, Chisso Corporation) | 0.330 |

(Manufacture of Light-Blocking Layer and Transparent Layer)

PREPARATION EXAMPLE 4

(1) The light-blocking layer composition of Preparation Example 1 is coated to be 1.5 μm thick on the pre-treated IZO substrate using a spin or slit coating, roll coating, screen printing, using an applicator, and the like and dried by heating a hot-plate at 70° C. to 100° C. for 1 minute to 10 minutes to remove a solvent therein.

(2) The transparent layer composition of Preparation Example 2 is coated using the same method as in the item (1) on a dried film of the light-blocking layer composition, and dried to obtain two-layered film.

(3) A mask having a halftone part (transmit 15% to 70% of light) for forming a light-blocking layer pattern and a full tone region part (transmit 100% of light) for forming a transparent layer pattern is put on the two-layered film, 200 nm to 500 nm of an actinic ray is radiated using exposer (Ushio Inc., HB-50110AA) to expose the front side. As for a light source in the radiation, a low pressure mercury lamp, a high pressure mercury lamp, an ultra high pressure mercury lamp, a metal halide lamp, an argon gas laser, and the like may be used, and X-ray, an electron beam, and the like may also be used if necessary. An exposure dose may vary depending on kind of components in the composition, mixing amount, and a film thickness during drying but may be less than or equal to 500 mJ/cm$^2$ when the high pressure mercury lamp is used (by using a 365 nm sensor).

(4) The exposed layer is developed with a 0.2 wt % potassium hydroxide (KOH) aqueous solution by using a developer (SVS Corp., SSP-200) to dissolve and remove an unnecessary region and leave the exposed region and thus, form a pattern.

(5) The image pattern obtained by the developing is heated at 230° C. for 30 minutes in an oven, to manufacture a specimen including a light-blocking layer and a transparent layer formed on the light-blocking layer.

PREPARATION EXAMPLE 5

A specimen is manufactured according to the same method in the Preparation Example 4, except that the transparent layer composition of Preparation Example 3 is used instead of the transparent layer composition of Preparation Example 2.

COMPARATIVE PREPARATION EXAMPLE 1

A specimen is manufactured according to the same method in the Preparation Example 4, except that the light-blocking layer composition of Preparation Example 1 is coated to be 3.0 μm thick without using the transparent layer composition of Preparation Example 2.

Evaluation 1: Evaluation of Optical Density (Optical Depth: OD)

The light-blocking layer composition prepared in Preparation Example 1 and the transparent layer compositions prepared in Preparation Examples 2 and 3 are respectively coated to be 1.5 µm thick on each 10 cm*10 cm IZO substrate using a spin coater (Mikasa Co., Ltd., Opticoat MS-A150), soft-baked (or pre-baked) on a hot-plate at 80° C. for 150 seconds, and exposed with 50 mJ by using an exposer (Ushio Inc., HB-50110AA) and a photo mask. Subsequently, the obtained organic coating layers (SVS Corp., SSP-200) are respectively developed in a 0.2 wt % potassium hydroxide (KOH) aqueous solution for 150 s and hard-baked (or post-baked) in an oven at 230° C. for 30 minutes, obtaining each patterned specimen. Optical density of the specimens are measured, and the results are shown in the following Table 4.

TABLE 4

|  | Preparation Example 1 | Preparation Example 2 | Preparation Example 3 |
|---|---|---|---|
| Optical density (OD) | 2.2 | 0 | 0.3 |

Evaluation 2: Solvent Resistance

The specimens according to Preparation Example 4, Preparation Example 5 and Comparative Preparation Example 1 are cut into a size of 1 cm*1 cm, put in a glass bottle containing 5 mL of NMP, allowed to stand in a 100° C. oven for 15 minutes, and examined to determine if decoloring occurs, and the results are shown in the following Table 5.

Decoloring Measurement Method

X: no decoloring when examined with the naked eye

O: high decoloring when examined with the naked eye

TABLE 5

|  | Preparation Example 4 | Preparation Example 5 | Comparative Preparation Example 1 |
|---|---|---|---|
| Decoloring | X | X | O |

Referring to Table 5, Preparation Examples 4 and 5 show excellent solvent resistance without decoloring compared with Comparative Preparation Example 1.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

<Description of Symbols>

110a, 110b, 110c: color filter
111: gate electrode
112: gate insulating layer
113: semiconductor
114: source electrode
115: drain electrode
116: protective layer
120: insulation layer
130: pixel electrode
140: light-blocking layer
150: transparent layer
152: main transparent layer
153: auxiliary transparent layer
160: liquid crystal layer
170: common electrode
200: lower substrate
300: upper substrate

What is claimed is:

1. A liquid crystal display (LCD) comprising:
a thin film transistor positioned on a lower substrate;
a plurality of color filters positioned on the thin film transistor and aligned to be spaced apart from each other;
an insulation layer positioned on the plurality of color filters;
a light-blocking layer positioned on the insulation layer;
a transparent layer positioned on the light-blocking layer and having a convex shape;
an upper substrate facing the lower substrate; and
a liquid crystal layer interposed between the lower substrate and the upper substrate, wherein the light-blocking layer includes an organic black pigment,
the transparent layer having the convex shape has a different shape from the light blocking layer and covers a whole or a part of a front surface of the light-blocking layer, wherein when the transparent layer covers a whole front surface of the light-blocking layer, the transparent layer has a different cross-sectional shape from the light blocking layer, and
the light-blocking layer and transparent layer are manufactured by:
coating a light-blocking layer composition and drying the same,
coating a transparent layer composition comprising a binder resin, a reactive unsaturated compound, a photopolymerization initiator, a black pigment and a solvent on the dried light blocking layer composition and drying the same, and
simultaneously exposing and developing the dried light-blocking layer composition and transparent layer composition.

2. The liquid crystal display of claim 1, wherein the organic black pigment comprises a compound represented by the following Chemical Formula 1:

[Chemical Formula 1]

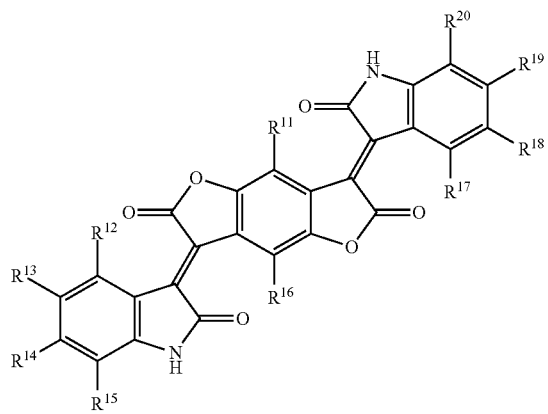

wherein, in the above Chemical Formula 1,
$R^{11}$ to $R^{20}$ are the same or different and are each independently hydrogen or substituted or unsubstituted C1 to C10 alkyl.

3. The liquid crystal display of claim 1, wherein the transparent layer comprises a main transparent layer and an auxiliary transparent layer.

4. The liquid crystal display of claim 3, wherein the main transparent layer has a thicker thickness than that of the auxiliary transparent layer.

5. The liquid crystal display of claim 3, wherein the main transparent layer supports the gap between the upper substrate and the lower substrate.

6. The liquid crystal display of claim 1, further comprising a pixel electrode between the insulation layer and the light-blocking layer.

7. The liquid crystal display of claim 1, further comprising a common electrode interposed between the upper substrate and the liquid crystal layer.

8. The liquid crystal display of claim 1, further comprising a common electrode directly on the lower substrate.

9. The liquid crystal display of claim 1, wherein the light-blocking layer has a larger optical density than that of the transparent layer by about 1.0 or greater.

10. The liquid crystal display of claim 1, wherein the light-blocking layer composition comprises a binder resin, a reactive unsaturated compound, a photopolymerization initiator, the organic black pigment, and a solvent.

11. The liquid crystal display of claim 10, wherein the light-blocking layer composition comprises about 1 wt % to about 30 wt % of the binder resin; about 1 wt % to about 20 wt % of the reactive unsaturated compound; about 0.05 wt % to about 5 wt % of the photopolymerization initiator; about 1 wt % to about 30 wt % of the organic black pigment, and a balance amount of the solvent.

12. The liquid crystal display of claim 1, wherein the transparent layer composition comprises about 3 wt % to about 70 wt % of the binder resin; about 2 wt % to about 40 wt % of the reactive unsaturated compound; about 0.1 wt % to about 5 wt % of the photopolymerization initiator; and a balance amount of the solvent.

13. The liquid crystal display of claim 1, wherein the transparent layer having the convex shape covers a part of a front surface of the light-blocking layer.

14. The liquid crystal display of claim 13, wherein the transparent layer having the convex shape covers a part of a front surface of the light-blocking layer and has a different cross-sectional shape than the light-blocking layer.

15. The liquid crystal display of claim 1, wherein the transparent layer having the convex shape covers a whole of a front surface of the light-blocking layer.

16. The liquid crystal display of claim 15, wherein the transparent layer having the convex shape covers a whole of a front surface of the light-blocking layer and includes at least a portion with a height that is different from the height of at least another portion relative to the front surface of the light-blocking layer.

17. A liquid crystal display (LCD) comprising:
a thin film transistor positioned on a lower substrate;
a plurality of color filters positioned on the thin film transistor and aligned to be spaced apart from each other;
an insulation layer positioned on the plurality of color filters;
a light-blocking layer positioned on the insulation layer;
a transparent layer positioned on the light-blocking layer and having a convex shape;
an upper substrate facing the lower substrate; and
a liquid crystal layer interposed between the lower substrate and the upper substrate,
wherein the light-blocking layer includes an organic black pigment,
the transparent layer includes a black pigment,
the transparent layer having the convex shape has a different cross-sectional shape from the light blocking layer, and
the light-blocking layer and transparent layer are manufactured by:
coating a light-blocking layer composition and drying the same,
coating a transparent layer composition comprising a binder resin, a reactive unsaturated compound, a photopolymerization initiator, a black pigment and a solvent on the dried light blocking layer composition and drying the same, and
simultaneously exposing and developing the dried light-blocking layer composition and transparent layer composition.

18. The liquid crystal display of claim 17, wherein the transparent layer having the convex shape covers a part of a front surface of the light-blocking layer.

19. The liquid crystal display of claim 17, wherein the transparent layer having the convex shape covers a whole of a front surface of the light-blocking layer.

* * * * *